Aug. 20, 1957   J. LINKE   2,803,169
DEVICES FOR AUTOMATICALLY DISINTEGRATING THE EMPTIED
AMMUNITION BELTS OF AUTOMATIC WEAPONS
Filed July 13, 1953   2 Sheets-Sheet 1
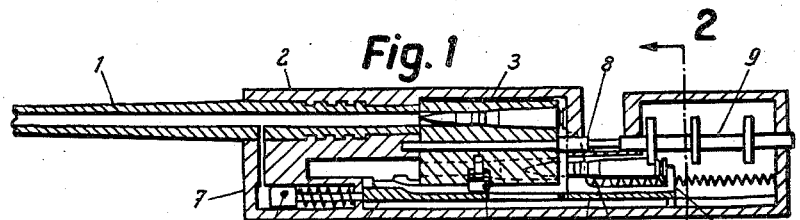
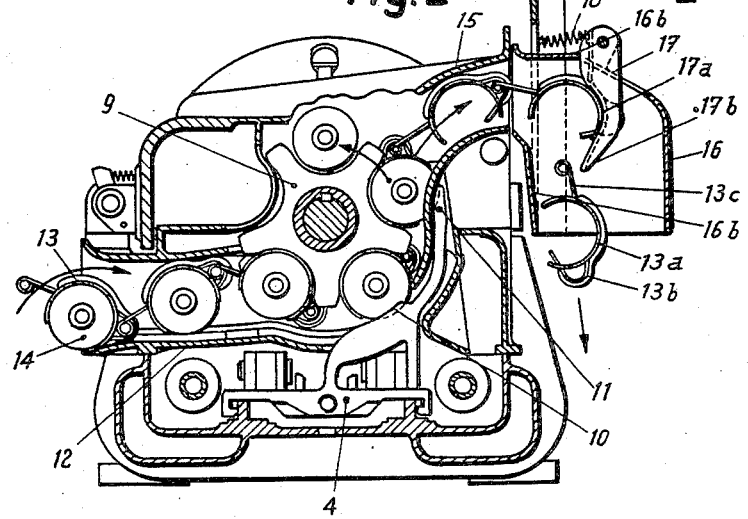
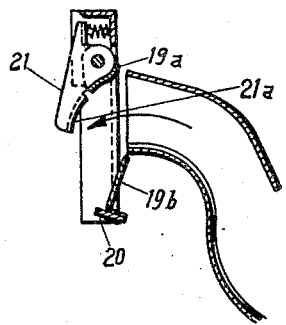
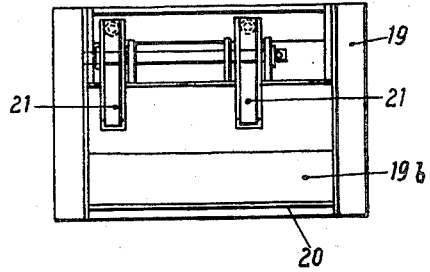
JOHANNES LINKE

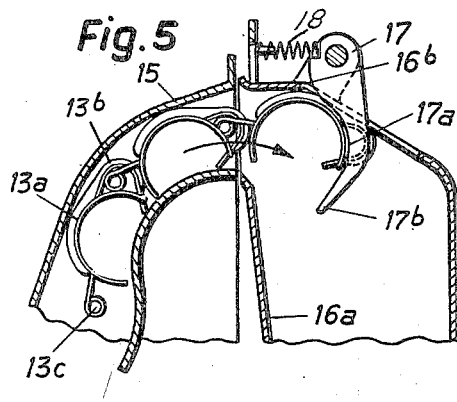
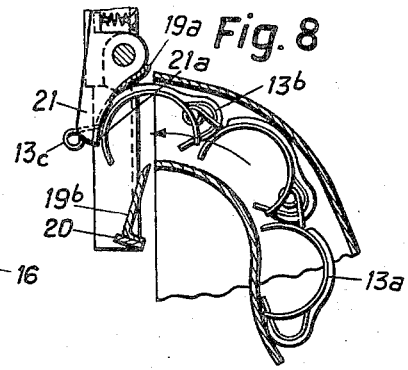
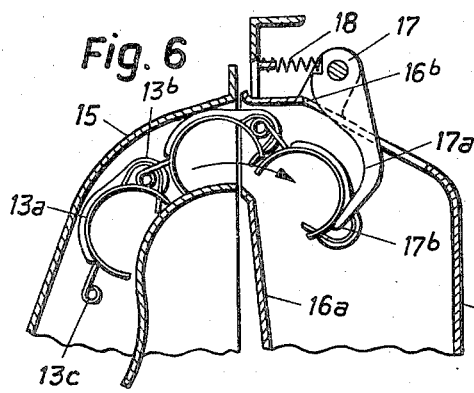
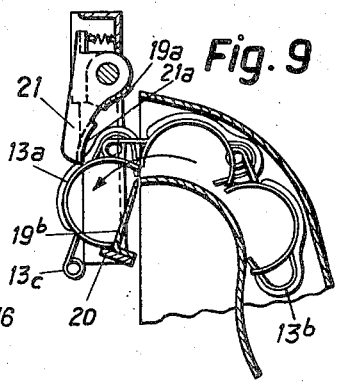
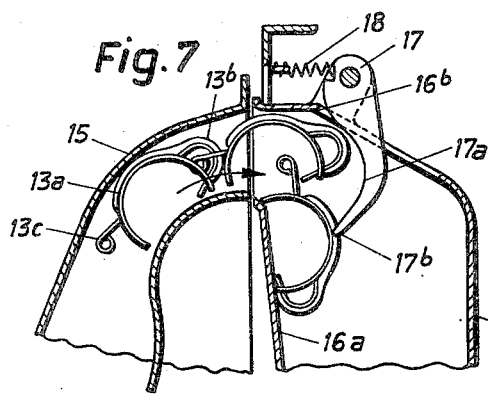
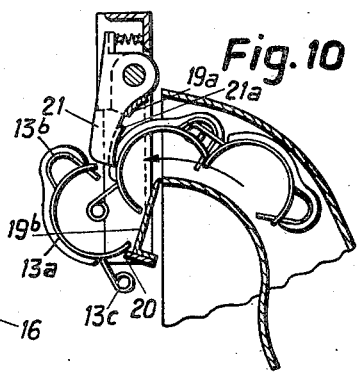

2,803,169

DEVICES FOR AUTOMATICALLY DISINTEGRATING THE EMPTIED AMMUNITION BELTS OF AUTOMATIC WEAPONS

Johannes Linke, Zurich, Switzerland, assignor to Machine Tool Works Oerlikon, Administration Company, Zurich-Oerlikon, Switzerland, a Swiss company Application July 13, 1953, Serial No. 367,624

Claims priority, application Switzerland July 18, 1952

3 Claims. (Cl. 89—33)

The invention relates to a device for automatically disintegrating the emptied ammunition belts of an automatic weapon which belts are composed of links each consisting of a part-cylindrical mantle having a hook fixed on one side and an eye fixed on the other side, adjacent links being interconnected by an eye of each link being engaged by a hook of the adjacent link.

The disintegrating of ammunition belts of automatic weapons into individual links at the exit from the weapon is for example often used in the armament of aircraft. It is then important that the disintegration of the emptied ammunition belt is carried out forcibly and is not disturbed either by the attitude of flight of the aircraft or by external acceleration forces acting on the said belt.

Devices for the disintegration of belts have been proposed which comprise a tipping ledge arranged in the channel for the empty belt transversely to the direction of its movement. This arrangement has mainly the purpose of effecting a retardation of the foremost link of the belt relative to the rest of the belt and in particular to the next subsequent link thereof. The relative movement thus set up between the two said links of the belt leads to their detachment from one another. The detached link is then either pushed away by the subsequent one, or it drops away under the action of gravity.

These devices have, however, the disadvantage of being suitable merely for comparatively slow moving ammunition belts, and can not be used for weapons of high firing rate, since their process of disintegration involves uncontrolled individual motions the progress of which in time can not be accelerated beyond a certain measure. Tests have shown that at a higher rate of firing jamming of the belt links occurred in the belt disintegrating channel. The occurring of this disturbance is favored also by forces occurring in extreme attitudes of flight.

It is the main object of the invention to provide a device for automatically disintegrating the emptied ammunition belts of automatic weapons which is of positive action and unaffected by both high rates of firing and attitude of flight or accelerations occurring during the flight of an aircraft fitted with the new device.

It is another object of the invention to provide a device as aforesaid which can be adapted both for a belt movement with the eyes of the interconnected links first or for movement with the hooks first.

With these and other objects in view I provide a device for automatically disintegrating the emptied ammunition belts of an automatic weapon which belts are composed of a part-cylindrical mantle having a hook fixed on one side and an eye fixed on the other side, adjacent links being interconnected by a hook of each link engaging an eye of the adjacent link, comprising in combination: a guide channel for the empty belt, an ejector channel arranged in continuation of the said guide channel, the said ejector channel having an oblique face directed downwards, at least one spring biased lever pivoted at the exit of the said guide channel having a concave deflector face facing the said guide channel and directed downwards, and having a nose pressing a belt link deflected by the said concave deflector face of the said lever against the said oblique face of the said ejector channel, The subsequent link of the advancing belt disengaging itself from the preceding link while the latter is thus held against the said oblique face and raising the said lever overriding its spring bias, thereby releasing the said disengaged preceding link.

In an embodiment adapted for movement of the belt with the hooks of the links first, the said ejector channel has at its entrance a downwardly directed deflector face deflecting the hooks of the advancing belts links prior to their mantles hugging the concave deflector faces of the said spring biased levers.

In an embodiment adapted for movement of the belt with the eyes first, the said ejector channel has at its entrance a downwardly directed deflector face deflecting the eyes of the advancing belt links prior to their mantles hugging the concave deflector faces of the said spring biased levers, and a tipping ledge below the said oblique face of the ejector channel, about which the foremost link is tipped off after having been disengaged from the next subsequent one.

These and other objects and features of the invention will become clearly apparent from the following description of two preferred embodiments of the invention given by way of example with reference to the accompanying diagrammatic drawings, in which:

Fig. 1 is a longitudinal section of an automatic weapon provided with the device according to the invention, Fig. 2 is a cross section of Fig. 1 along the line 1—1 on a larger scale of an embodiment of the disintegrator device adapted for hook first movement of the belt links, Fig. 3 is a cross section on the same scale as Fig. 2 of a detail of a disintegrating device adapted for eye first movement of the belt links, Fig. 4 is a lateral elevation of the detail of Fig. 3, Figs. 5 to 7 show a succession of phases of the disintegration of an empty ammunition belt in a device according to Fig. 2 for the hooks first movement of the belt links in diagrammatic representation showing only the components essential for the understanding of the disintegration process, Figs. 8 to 10 are a representation corresponding to Figs. 5 to 7 of a device according to Fig. 3 for the eyes first movement of the belt links.

As illustrated in Fig. 1, the barrel 1 of the automatic weapon is inserted in the casing 2 thereof by means of a bayonet joint. In the casing 2 a revolver drum 3 is journalled rotatably. The drum 3 has a number of cartridge chambers which upon rotation of the drum 3 successively come into juxtaposition with the barrel 1. The rotational movement of the drum 3 is effected in the usual manner by a slide 4 which acts by means of a cam guide through rollers 5 on the drum 2. The slide 4 is reciprocated by the gas piston 6 arranged in the gas tapping chamber 7, and by a return spring. Coaxially to the drum 3, and connected therewith by a coupling 8, a star shaped cartridge conveyer member 9 is journalled, to which the rounds of ammunition 14 are supplied in the interconnected links 13 of the ammunition belt in the direction of the arrow on the left hand side of Fig. 2. The conveyer member 9 performs a step-wise rotary motion in the anticlockwise direction as indicated by the arrow and carries along the rounds of ammunition, which are pushed into the chambers of the revolver drum 3 by means of cams 10, 11 of the slide 4. The empty belt links 13 have hooks 13b fixed at one side of their part-cylindrical mantles 13a, and eyes 13c fixed to the other side thereof, the eyes and hooks of adjacent links being still interconnected while they move away from the conveyer member 9 in the direction of the arrow through the guide channel 15 for the empty links, and from there into the ejector channel 16 arranged in continuation of the said guide channel.

The said ejector channel 16 has an oblique face 16a directed downwards on its inner, lower side, and a curved guide face 16b for the hooks 13b on its outer, upper side. Near its entrance a pair of levers 17 is pivoted about an axis parallel to that of the conveyer member 9, the said levers being biased by springs 18 into the path of the empty belt links 13. These levers 17 have concave guide or deflector faces 17a facing the exit from the guide channel 15 and adapted to hug the mantles 13a of the successive empty links 13, and to guide the same towards the said oblique face 16a of the ejector channel 16. The said levers 17 have downwardly directed noses 17b by means of which they hold the said empty links 13 against the said oblique face 16a under the action of their biasing springs 18.

The manner of operation of the device according to Fig. 2 for hooks first movement of the belt links will now be described with reference to Figs. 5 to 7.

The belt of still interconnected links is moved on by the conveyer member 9 towards the right in the drawings, the links being jerked one pitch at a time at each shot fired. In the position of Fig. 5, the first belt link has left the guide channel 15 for the empty belt links of the weapon, and has entered the ejector channel 16, its mantle 13a being hugged by the concave guide or deflector faces 17a of the spring biased pair of levers 17. When the conveyer member 9 moves on another step, the belt link 13 is deflected downwardly along the guide faces 17a (Fig. 6). The levers 17 are slightly rocked outwards by the pressure of the belt link 13 on their noses 17b. At the same time the belt link 13 is turned over. Subsequently it slides past the noses 17b of the levers 17, and is pressed by the same against the oblique face 16a of the ejector channel 16, the said levers 17 rocking back under their spring bias (Fig. 7). Thereby the foremost belt link 13 detaches its eye 13c from the hook 13b of the subsequent link. Upon further transport of the belt in the forward direction, the foremost link is expelled by the subsequent one.

The disintegrating device illustrated in Figs. 3 and 4 for the supply of the belt links with their eyes first is similar to the one shown in and described with reference to Fig. 2. In addition to the two levers, denoted 21 in this embodiment, arranged at the exit from the guide channel for the empty belt, and in addition to the deflector face 19b sloping obliquely downwards in the ejector channel, this device has also a tipping ledge 20 arranged below the said oblique face 19b. This is necessary in order to effect the turning-over of the belt link arriving with its eye first.

The manner of operation of this disintegrator device for supply of the links with the eyes first is as follows:

Upon emergence of the foremost belt link 13 from the guide channel for the empty belt it is deflected by the deflector face 19a at the entrance into the ejector channel, opposite the said guide channel (Fig. 3), and abuts on the concave guide faces 21a of the levers 21 (Fig. 8). By the continued movement of the conveyer member the belt link is deflected downwardly along the concave faces 21a hugging its mantle 13a, and eventually abuts on the tipping ledge 20 (Fig. 9). At the same time it is pressed against the oblique face 19b of the ejector channel by the noses of the said levers 21 under their spring bias. By the continued movement of the conveyer member the levers 21 are rocked outwards still further by the next subsequent link (Fig. 10), whereby the foremost link is released and tipped about the ledge 20, its hook 13b getting disengaged from the eye of the subsequent link. Eventually the foremost link drops off downwardly. This process repeats itself with the consecutive links.

While I have described what may be considered typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

1. In an automatic weapon the combination of an ammunition belt with a plurality of links including a foremost first link and a succeeding second link, each link comprising a semi-cylindrical part with a front and rear longitudinal curved rim, said part forming a seating for a cartridge, and furthermore comprising two attachments provided in the vicinity of said longitudinal rims extending essentially along a common plane parallel to said longitudinal rims, one of said last mentioned attachments being formed as an eye, the other attachment being formed as an open hook, in order to form a joint when the hook of a belt link engages with an eye of an adjacent link, and which is detachable in a disengaging position in which the said planes of both links are positioned transverse to each other by a relative movement of said last mentioned links transverse to said longitudinal rims, a feed channel for said cartridge belt with a front and a rear end, means arranged in the vicinity of said rear end of said channel in order to impart a forward movement directed from the rear against the front end of said channel; a supporting surface for the belt members that is arranged at the front end of the channel and stands at an angle to the longitudinal direction of the channel; an element arranged in front of the forward end of said channel and pressing elastically against said channel, said element having a vaulted surface whose concave side is turned toward the forward end of said channel, in order, at the forward movement of the belt, to guide the foremost member, with a turning of the latter around the axis of said joint formed with the said succeeding member against said supporting surface, and an instrument that is provided on one of the two parts formed by the said elements and the supporting surface, that takes hold of the foremost member jointly with the supporting surface for the temporary interruption of the forward movement of the foremost member along said supporting surface whereby said joint between said foremost member and said succeeding member is disengaged by said forward movement.

2. In an automatic weapon the combination of an ammunition belt with a plurality of links including a foremost first link and a succeeding second link, each link comprising a semi-cylindrical part with a front and a rear longitudinal rim, said part forming a seating for a cartridge and furthermore comprising two attachments provided in the vicinity of said longitudinal rims extending essentially along a common plane parallel to said longitudinal rims, one of said last mentioned attachments in the vicinity of said rear longitudinal rim being formed like an eye, while said attachment located in the vicinity of the front longitudinal rim is formed like an open hook in order to form a joint when said hook of a link of said plurality of links engages with the eye of an adjacent front link, which is a disengaging position, in which said planes of both links are positioned transverse to each other, is detachable by a relative movement of both last mentioned links effected transverse to said last mentioned longitudinal rims, a feed channel extending transverse to said longitudinal rims for said ammunition belt with a front and a rear end, means arranged in the vicinity of said rear end of said channel in order to impart a forward movement to the belt from the rear against the front end of said channel; guiding means arranged in the vicinity of the front end of said channel for said belt links, said guiding means comprising an arched guiding plane formed to engage with its concave side on said semi-cylindrical part of said first link in order to bring said first link by a movement transverse to said longitudinal rims to said disengaging position, and furthermore comprising a supporting plane for said longitudinal rims of said first link positioned opposite to the concave side of said guiding plane, and comprising cam means directed against said supporting plane which are formed in order to press in the disengaging position of said first and second links said first link elastically against said supporting plane, whereby on account of said forward movement of said belt said second link is displaced relatively to said first link for disengaging said joint.

3. In an automatic weapon the combination of an ammunition belt with a plurality of links including a foremost first link and a succeeding second link, each link comprising a semi-cylindrical part with a front and a rear longitudinal rim, said part forming a seating for a cartridge, and furthermore comprising two attachments provided in the vicinity of said longitudinal rims extending essentially along a common plane parallel to said longitudinal rims, one of said last mentioned attachments in the vicinity of said rear longitudinal rim being formed like an open hook, while said attachment located in the vicinity of said front longitudinal rim is formed like an eye, in order to form a joint when said hook of said front link engages with an eye of an adjacent rear link, which joint when in a disengaging position, in which said planes of both links are positioned transverse to each other, is detachable by a relative movement of both last mentioned links effected transverse to said longitudinal rims, a feed channel extending transverse to said longitudinal rims for said ammunition belt with a front and rear end, means arranged in the vicinity of said rear end of said channel in order to impart a forward movement to said belt from the rear against the front end of said channel, guiding means arranged in the vicinity of the front end of said channel for said belt links, said guiding means comprising an arched guiding plane displaceable in the direction of said forward movement of said belt at the front end of said channel, elastic means for biasing said guiding plane against the front end of said channel, said guiding plane being formed to engage said first link under the influence of said forward movement of the belt against its concave side with the semi-cylindrical part of the latter and to move said link by a movement effected transverse to said longitudinal rims into said disengaging position relative to said second link, furthermore comprising a ledge for said front longitudinal rim of said first link, said ledge being formed to form a pivot for said first link to disengage the latter from said guiding plane by pivoting said first link upon said ledge under the influence of the forward movement of said belt, and to press said guiding plane against said succeeding second link by said elastic means to effect said relative movement between said first and second link.

References Cited in the file of this patent

UNITED STATES PATENTS

| | | |
|---|---|---|
| 2,467,571 | Webb | Apr. 19, 1949 |
| 2,600,492 | Dixon | June 17, 1952 |

FOREIGN PATENTS

| | | |
|---|---|---|
| 490,221 | Great Britain | Aug. 10, 1938 |